(12) United States Patent
Pari

(10) Patent No.: US 9,490,590 B2
(45) Date of Patent: Nov. 8, 2016

(54) ANTENNA CONNECTOR SEALING NUT HAVING A MECHANICAL ENCLOSURE HOUSING A RADIO FREQUENCY CONNECTOR

(71) Applicant: NOKIA SOLUTIONS AND NETWORKS OY, Espoo (FI)

(72) Inventor: Mika Petri Pari, Tupos (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 143 days.

(21) Appl. No.: 14/615,103

(22) Filed: Feb. 5, 2015

(65) Prior Publication Data

US 2016/0233623 A1 Aug. 11, 2016

(51) Int. Cl.

| H01R 43/26 | (2006.01) |
| H01R 13/66 | (2006.01) |
| H01R 9/18 | (2006.01) |
| H01R 13/52 | (2006.01) |
| G02B 6/42 | (2006.01) |

(52) U.S. Cl.
CPC ......... *H01R 13/6683* (2013.01); *G02B 6/4278* (2013.01); *G02B 6/4279* (2013.01); *H01R 9/18* (2013.01); *H01R 13/5202* (2013.01); *H01R 43/26* (2013.01)

(58) Field of Classification Search
CPC .............. H01R 43/26; H01R 13/5202; H01R 13/6683; H01R 25/003; H01B 7/282; G02B 6/4279

USPC ....... 250/239, 551, 227.11, 227.24; 439/274, 439/275, 578–580; 343/702, 718, 790, 872; 385/8, 9
See application file for complete search history.

(56) References Cited

U.S. PATENT DOCUMENTS 7,207,820 B1 * 4/2007 Montena ............ H01R 13/5219
439/275

\* cited by examiner

*Primary Examiner* — Que T Le
(74) *Attorney, Agent, or Firm* — Squire Patton Boggs (US) LLP

(57) ABSTRACT

Various antenna-based systems may benefit from hardware for antenna connectors. For example, certain radio systems may benefit from an antenna connector sealing nut or radio frequency connector ingress protection cap structure. An apparatus can include a connector main body comprising a ring-shaped member having an inner circumference defining a passage and an outer circumference. The apparatus can also include a connector axial body comprising a cylindrical member arranged partially within the passage. The connector main body can be configured to interface with a radio frequency connector at the inner circumference. The connector main body can be configured to interface, at the outer circumference, with a mechanical enclosure housing the radio frequency connector. The connector axial body can be configured to interface with an inner portion of the radio frequency connector. The connector axial body can be configured to provide a radio frequency path through the connector axial body.

20 Claims, 11 Drawing Sheets

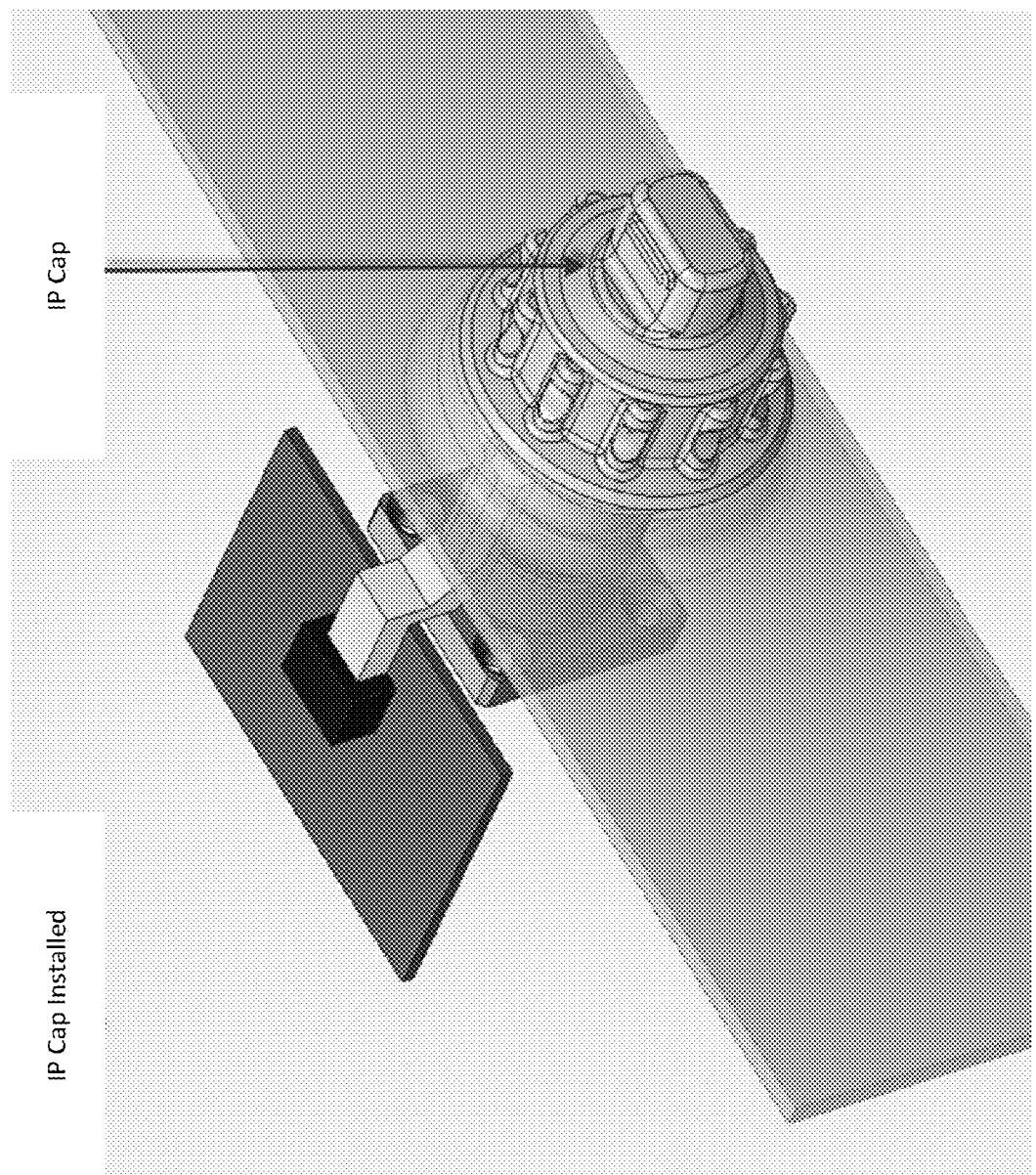

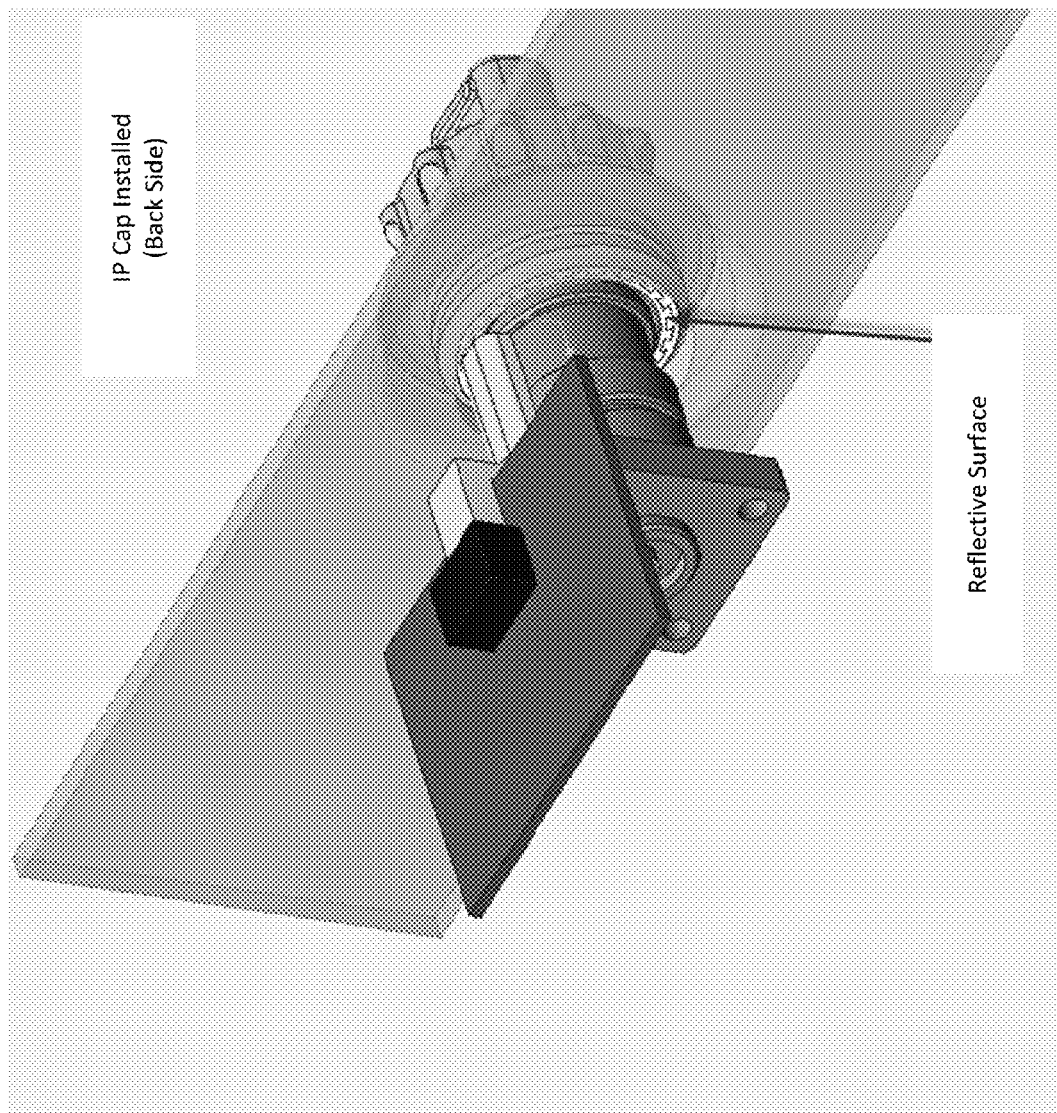

ANTENNA CONNECTOR SEALING NUT HAVING A MECHANICAL ENCLOSURE HOUSING A RADIO FREQUENCY CONNECTOR

BACKGROUND

1. Field

Various antenna-based systems may benefit from hardware for antenna connectors. For example, certain radio systems may benefit from an antenna connector sealing nut or radio frequency connector ingress protection cap structure.

2. Description of the Related Art

Conventionally standard connectors are used. Such standard connectors may provide suitable radio frequency (RF) connection, but may not provide suitable environmental or ingress protection (IP).

To effect such environmental protection, after installation such standard connectors may be taped around with butyl tape layer and after that a final layer cam be taped with a vinyl tape. Another way to achieve such environmental protection is to use various types of shrink sleeves.

Accordingly, current RF connector necks are quite long because the connector need spaces for IP tape or shrink sleeve. Conventional wisdom suggests that a short neck would create an environmental problem, because there would be insufficient space to provide the tape or shrink sleeve.

This long neck and tape or sleeve may pose a variety of issues. For example, because the neck is long, the overall arrangement must account for the fact that in external IP sealing a lot of space should be reserved for sealing installation.

SUMMARY

According to certain embodiments, an apparatus can include a connector main body comprising a ring-shaped member having an inner circumference defining a passage and an outer circumference. The apparatus can also include a connector axial body comprising a cylindrical member arranged partially within the passage. The connector main body can be configured to interface with a radio frequency connector at the inner circumference. The connector main body can be configured to interface, at the outer circumference, with a mechanical enclosure housing the radio frequency connector. The connector axial body can be configured to interface with an inner portion of the radio frequency connector. The connector axial body can be configured to provide a radio frequency path through the connector axial body.

In certain embodiments, a method for manufacturing an apparatus can include providing a connector main body comprising a ring-shaped member having an inner circumference defining a passage and an outer circumference. The method can also include arranging, partially within the passage, a connector axial body comprising a cylindrical member. The method can further include configuring the connector main body to interface with a radio frequency connector at the inner circumference. The method can additionally include configuring the connector main body to interface, at the outer circumference, with a mechanical enclosure housing the radio frequency connector. The method can also include configuring the connector axial body to interface with an inner portion of the radio frequency connector. The method can further include configuring the connector axial body to provide a radio frequency path through the connector axial body.

A method, according to certain embodiments, of installing an apparatus can include providing an apparatus that can include a connector main body comprising a ring-shaped member having an inner circumference defining a passage and an outer circumference. The apparatus can also include a connector axial body comprising a cylindrical member arranged partially within the passage. The connector main body can be configured to interface with a radio frequency connector at the inner circumference. The connector main body can be configured to interface, at the outer circumference, with a mechanical enclosure housing the radio frequency connector. The connector axial body can be configured to interface with an inner portion of the radio frequency connector. The connector axial body can be configured to provide a radio frequency path through the connector axial body. The method can also include inserting the apparatus into the mechanical enclosure and radio frequency connector. The method can further include rotating the apparatus to secure the apparatus in combination with the mechanical enclosure and radio frequency connector.

BRIEF DESCRIPTION OF THE DRAWINGS

For proper understanding of the invention, reference should be made to the accompanying drawings, wherein:

FIG. 8A illustrates an apparatus include an ingress protection cap, according to certain embodiments.

FIG. 8B illustrates the apparatus of FIG. 8A in a reverse angle.

DETAILED DESCRIPTION

Certain embodiments relate to a male connector structure that can include a thread/locking part and a sealing part. New connector types, like 4.3-10 may not need a huge torque for male connector nut installation. Thus, certain connectors can be attached with low torque hand tightening or quick lock used in the connector. Certain embodiments provide combined attaching and sealing to the same part. Moreover, certain embodiments can use an over molding process. Over molding can refer to a process in which melted plastic is injected atop another material/part. Certain embodiments can also use other types of connectors. Certain embodiments may address an ingress protection (IP)/environmental sealing issue in an antenna jumper cable to radio connection.

Figure 1:
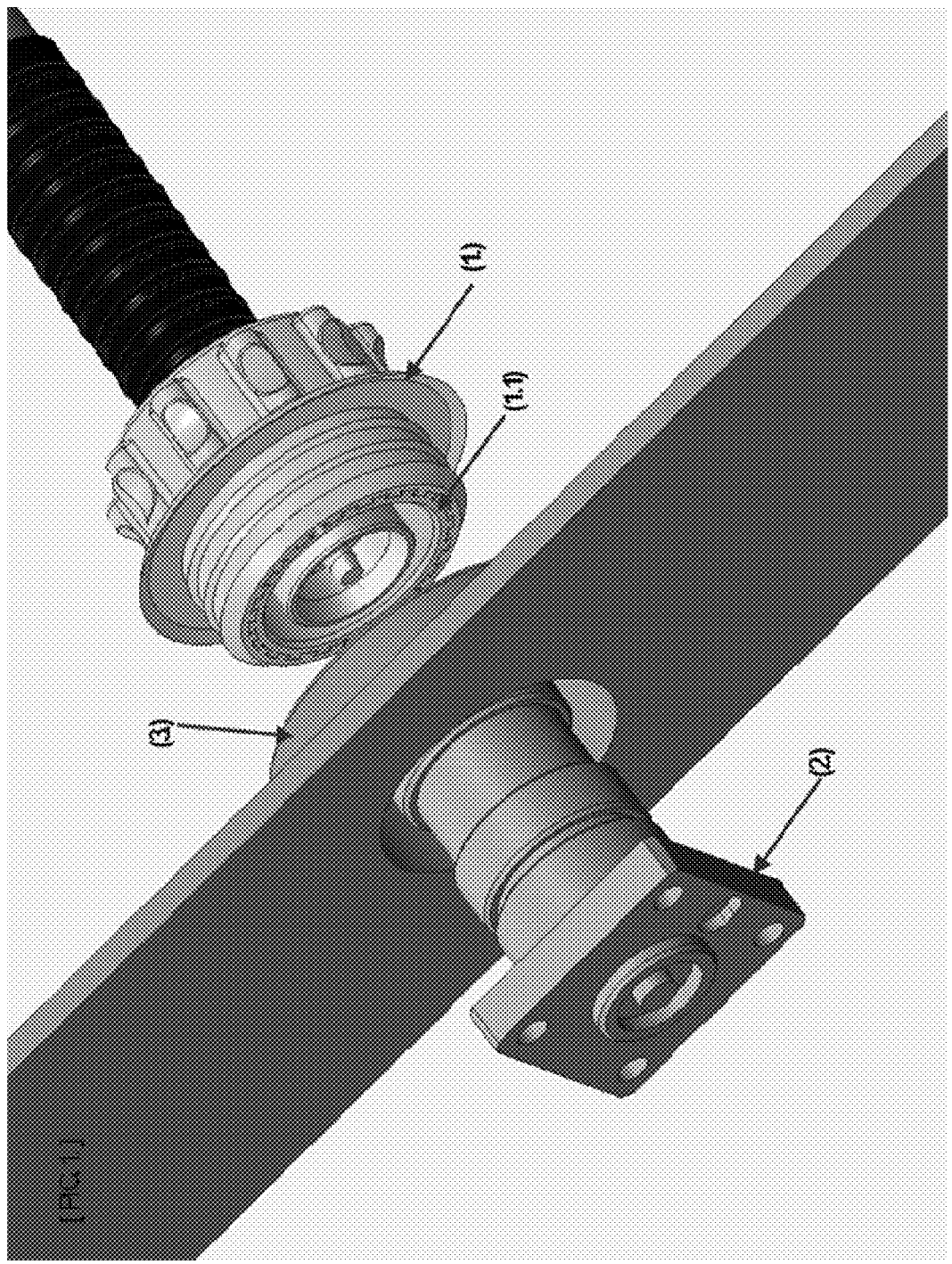
FIG. 1 illustrates an overview of an arrangement according to certain embodiments.

FIG. 1 illustrates an overview of an arrangement according to certain embodiments. As shown in FIG. 1, an arrangement can include a cap part 1, a nut part 1.1, an RF connector 2, and a radio front panel or other RF mechanical enclosure 3. The RF connector 2 may, for example, be a 4.3-10 coaxial connector.

Figure 2:
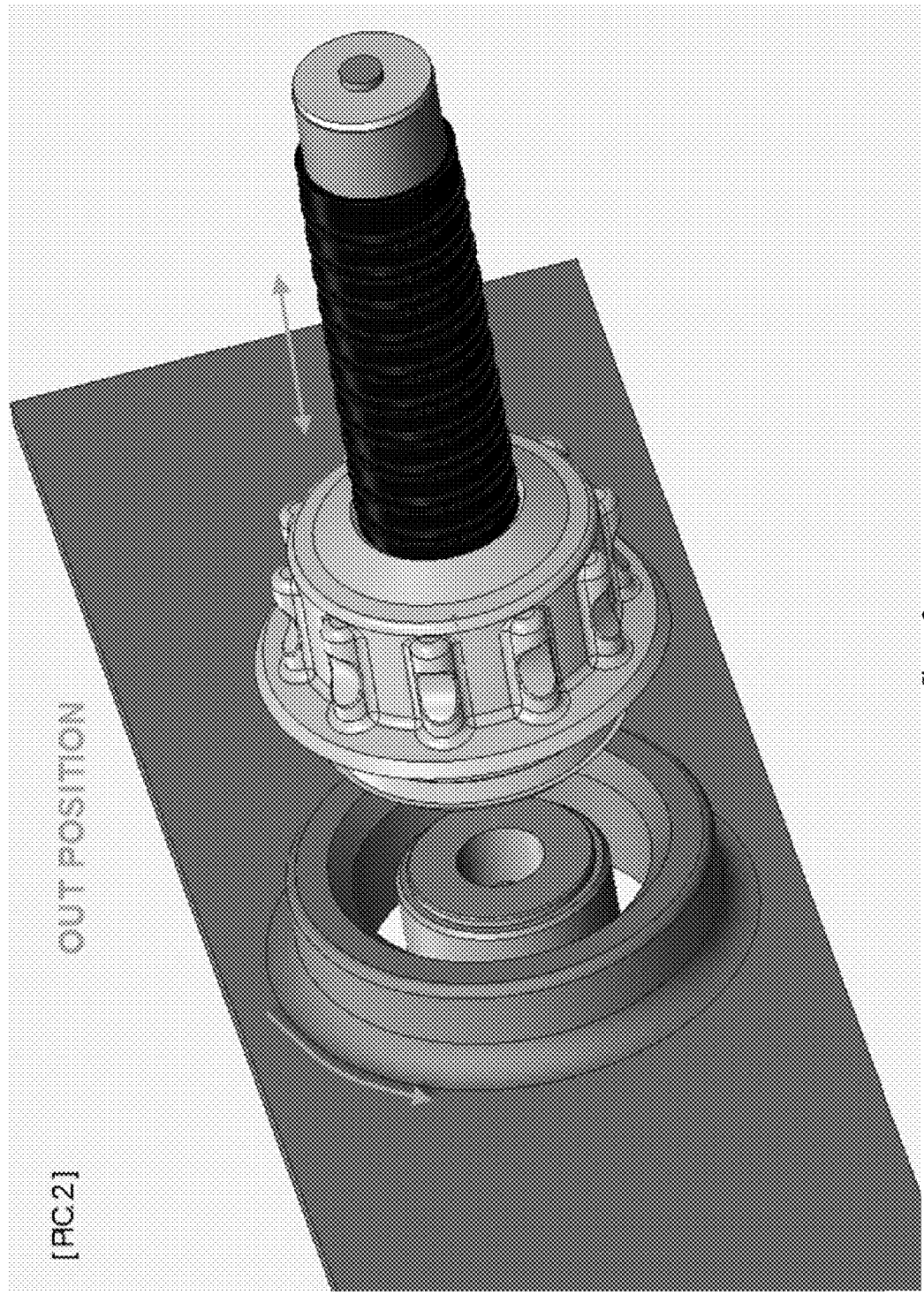
FIG. 2 illustrates an "out" position of an arrangement according to certain embodiments.
Figure 3:
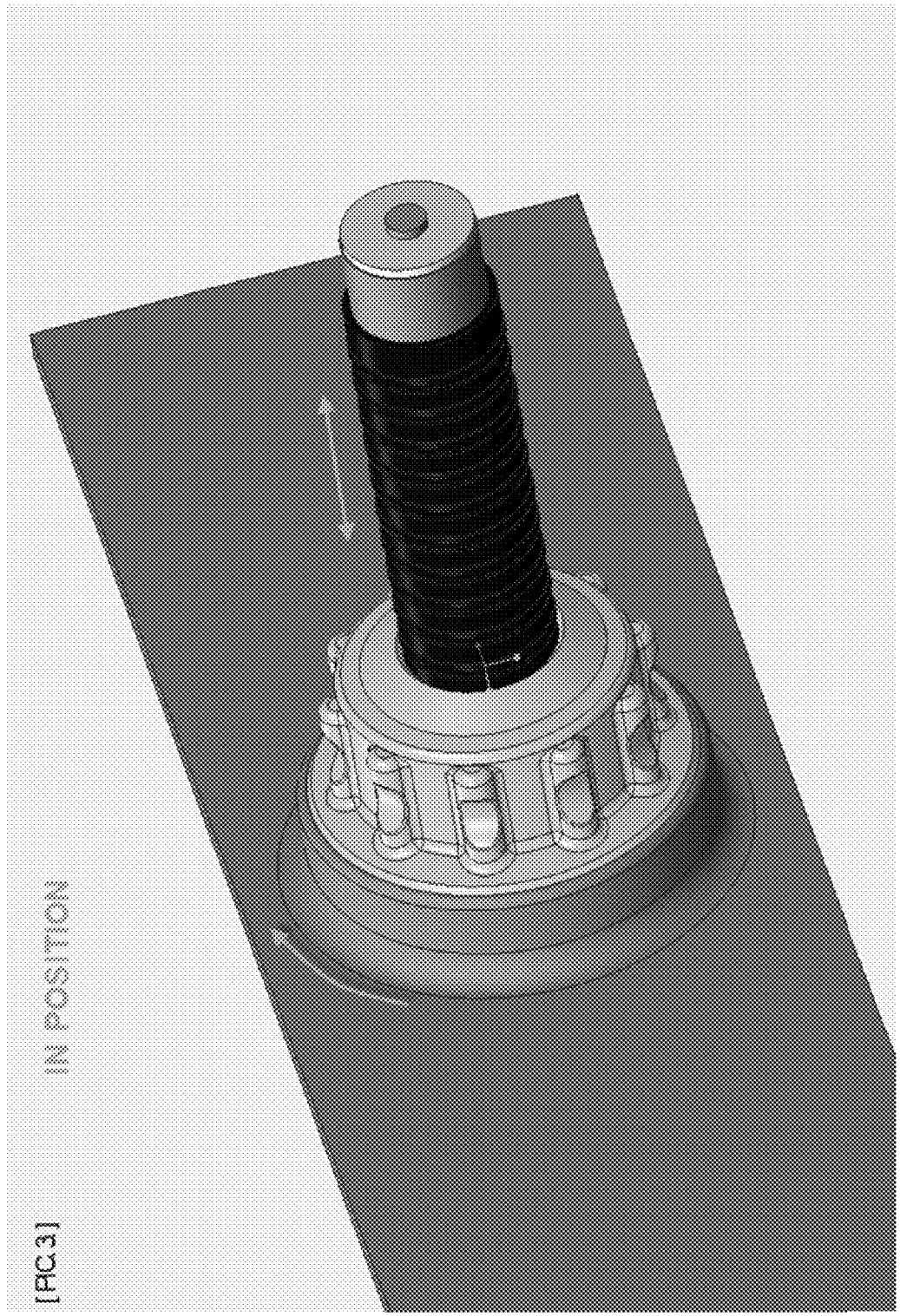
FIG. 3 illustrates an "in" position of an arrangement according to certain embodiments.

FIGS. 2 and 3 illustrate how an antenna jumper cable assemble can go into a radio, as well as how a sealing nut can go into a radio part interface and close the interface both radially and axially at the same time. FIG. 2 illustrates an "out" position of an arrangement according to certain embodiments. FIG. 3 illustrates an "in" position of an arrangement according to certain embodiments. The arrangement can be moved from the out position to the in position by, for example, hand tightening.

The new connector nut can be made of metal or reinforced plastic, part of which is an over-molded rubber type material. This kind of arrangement may work with connector types like 4.3-10. Furthermore, such an arrangement may not need high tightening torque. Thus, for example, this kind of nut can be installed by pure hand or by a very low torque tool.

Figure 4:
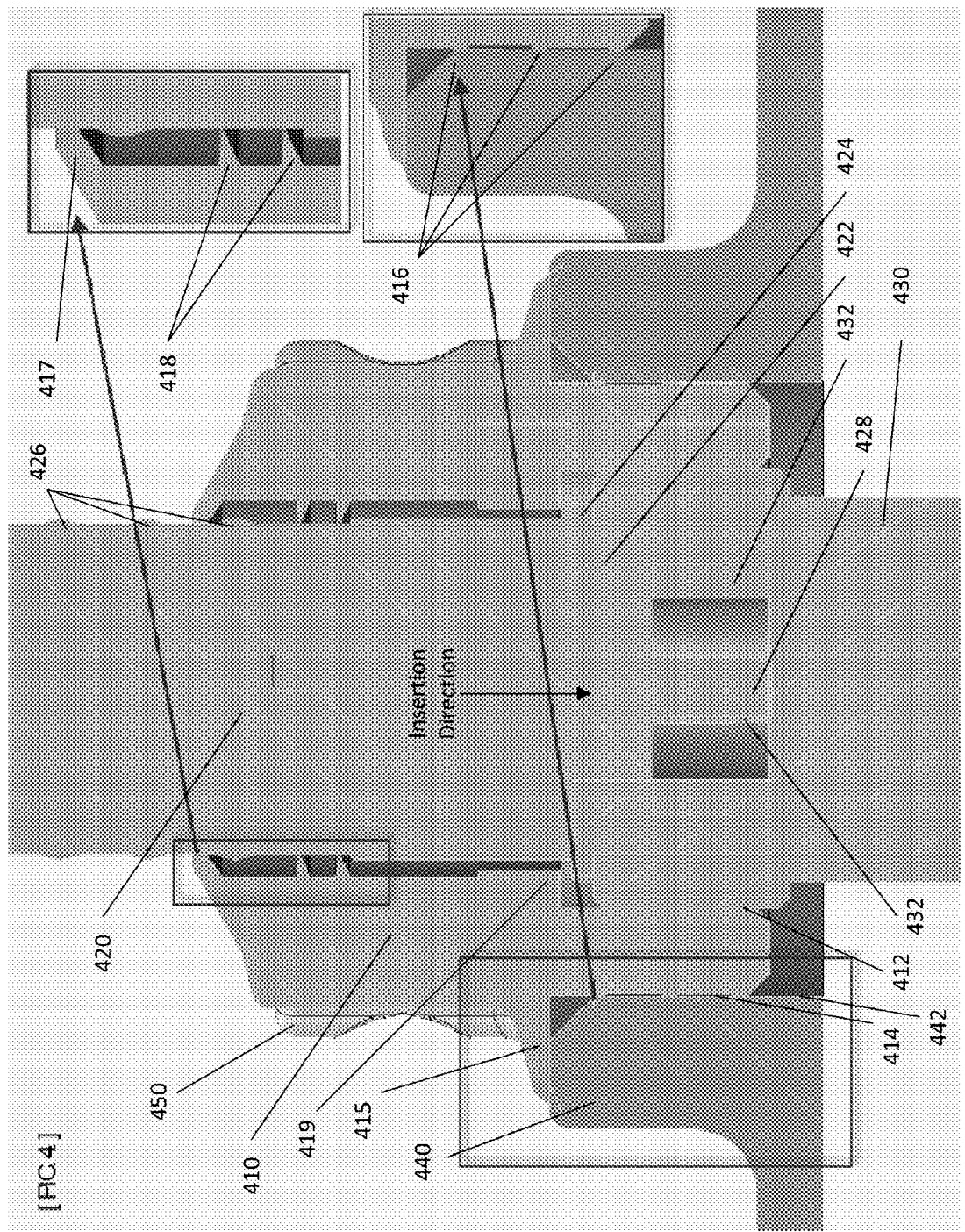
FIG. 4 illustrates an arrangement, according to certain embodiments, in cross-section view.

FIG. 4 illustrates an arrangement, according to certain embodiments, in cross-section view. As shown in FIG. 4, the arrangement can include sealing "lips" in at least two places. These or similar structures can permit nut rotation and axial flow to other mechanical parts. The same principles can be applied to so-called quick fit connections. With quick fit cases it may be possible to add snap locking mechanism to a plastic part of the device.

More particularly, the apparatus of FIG. 4 can include a connector main body 410 that includes a ring-shaped member having an inner circumference 412 defining a passage and an outer circumference 414. The apparatus can also include a connector axial body 420 that includes a cylindrical member arranged partially within the passage. Part of the connector axial body 420 may extend outside the connector main body 410.

The connector main body 410 can be configured to interface with a radio frequency connector 430 at the inner circumference 412. The radio frequency connector 430 may be a 4.3-10 connector.

The connector main body 410 can be configured to interface, at the outer circumference 414, with a mechanical enclosure 440 housing the radio frequency connector 430. The mechanical enclosure 440 may be a radio front panel.

The connector axial body 420 can be configured to interface with an inner portion 432 of the radio frequency connector 430. Additionally, the connector axial body 420 can be configured to provide a radio frequency path through the connector axial body 420. For example, connector axial body 420 may be or include an antenna jumper cable.

The connector main body 410 can include a first shoulder 415 extending radially outward from the outer circumference 414. The first shoulder 415 can be configured to seat the apparatus on the mechanical enclosure 440. The end of the shoulder 415 be angled downward as shown, although other configurations are also permitted. The downward angled portion may be omitted in certain embodiments, for example. The first shoulder 415 can be configured to seal the interface between the outer circumference 414 and the mechanical enclosure 440. For example, when installed the first shoulder 415 may tightly grip the mechanical enclosure 440 and prevent water, oil, or other contaminants from entering the mechanical enclosure.

The connector main body 410 can further include a first plurality of protrusions 416 extending from the outer circumference 414 of the connector main body 410. The first plurality of protrusions 416 can be configured to provide an interference fit with an inner circumference 442 of the mechanical enclosure 440. As shown more clearly in FIGS. 1 and 2, this first plurality of protrusions 416 may be formed as rings. The first plurality of protrusions 416 may be provided below the first shoulder 415.

The first plurality of protrusions 416 can be configured to permit movement of the apparatus in an insertion direction into the mechanical enclosure 440 and to resist movement of the apparatus in an opposite direction to the insertion direction. This may be accomplished by an angled surface as shown or by any other similar barb or anchor arrangement. The first plurality of protrusions 416 may also be configured assist in ingress protection by making it more difficult for water, oil, or other containments to enter the mechanical enclosure 440.

The connector main body 410 can also include a second shoulder 417. The second shoulder 417 can be configured to seal an interface between the connector main body 410 and the connector axial body 420. The connector main body 410 can include a second plurality of protrusions 418 extending from the inner circumference 412 of the connector main body 410. The second plurality of protrusions 418 can be configured to provide an interference fit with the connector axial body 420. Thus, the second shoulder 417 and the second plurality of protrusions 418 can help to provide ingress protection.

The second plurality of protrusions 418 can be configured to permit movement of the connector axial body 420 in a direction of opposite an insertion direction into the mechanical enclosure 440 and to resist movement of the connector axial body 420 in the insertion direction. This may be accomplished by an angled surface as shown or by any other similar barb or anchor arrangement.

The connector main body 410 can also include a third shoulder 419. The third shoulder 419 is configured to permit movement of the connector axial body (420) in an insertion direction into the mechanical enclosure (440) and to resist movement of the connector axial body (420) in a direction opposite the insertion direction.

The connector axial body 420 can include a termination portion 422 at one end thereof. The termination portion 422 can include a fourth shoulder 424, which can be configured to seat the connector axial body 420 on the radio frequency connector 430.

The connector axial body 420 can also include a plurality of ridges 426. The plurality of ridges 426 can be configured to limit sliding of the connector axial body 420 with respect to connector main body 410.

The connector axial body 420 can include a male connector 428. The male connector may be configured to be inserted into a corresponding female connector 432 in the radio frequency connector 430.

The apparatus can also include a grip 450 disposed on an outer surface of the connector main body 410. The grip 450 may be designed to permit a user to grip the connector main body 410 with a finger and thumb and to insert and secure the apparatus.

The connector main body 410 may be viewed as a thread/locking part, as described above. Similarly, the connector axial body 420 may be viewed as a sealing part, as also described above.

Figure 5:
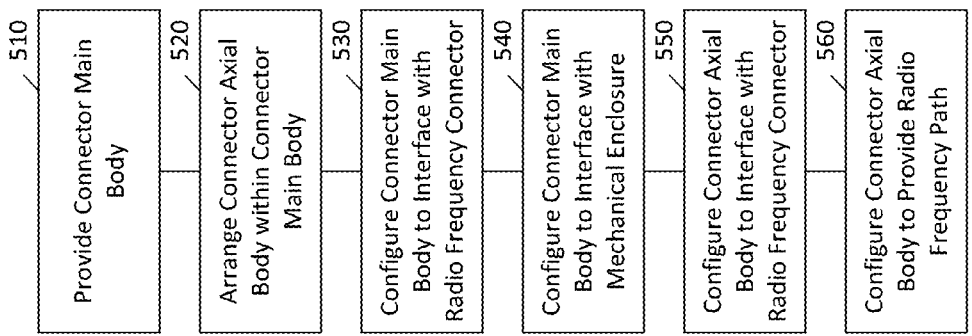
FIG. 5 illustrates a method of manufacturing an apparatus, according to certain embodiments.

FIG. 5 illustrates a method of manufacturing an apparatus, according to certain embodiments. The apparatus in question can be, for example, the same apparatus illustrated in FIGS. 1 through 4. The method can include, at 510, providing a connector main body comprising a ring-shaped member having an inner circumference defining a passage and an outer circumference. The method can also include, at 520, arranging, partially within the passage, a connector axial body comprising a cylindrical member.

The method can include, at 530, configuring the connector main body to interface with a radio frequency connector at the inner circumference. The method can also include, at 540, configuring the connector main body to interface, at the outer circumference, with a mechanical enclosure housing the radio frequency connector. The method can further include, at 550, configuring the connector axial body to interface with an inner portion of the radio frequency connector. The method can additionally include, at 560, configuring the connector axial body to provide a radio frequency path through the connector axial body. Other modifications or features can be included as described above with reference to FIGS. 1 through 4.

Figure 6:
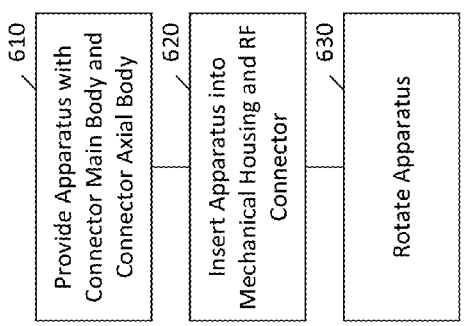
FIG. 6 illustrates a method of installing an apparatus, according to certain embodiments.

FIG. 6 illustrates a method of installing an apparatus. The apparatus may be an apparatus as illustrated in FIGS. 1 through 4 and/or whose manufactured has been described with reference to FIG. 5. The method can include, at 610, providing an apparatus that includes a connector main body including a ring-shaped member having an inner circumference defining a passage and an outer circumference. The apparatus can also include a connector axial body including a cylindrical member arranged partially within the passage. The connector main body can be configured to interface with a radio frequency connector at the inner circumference. The connector main body can be configured to interface, at the outer circumference, with a mechanical enclosure housing the radio frequency connector. The connector axial body can be configured to interface with an inner portion of the radio frequency connector. The connector axial body can be configured to provide a radio frequency path through the connector axial body. Other modifications or features can be included as described above with reference to FIGS. 1 through 5.

The steps of the method do not have to be practiced in the listed order. For example, the configuring of the various components can be performed in a variety of ways, such as in a molding process if the apparatus is formed of molded resin.

The method can also include, 620, inserting the apparatus into the mechanical enclosure and radio frequency connector. The method can further include, at 630, rotating the apparatus to secure the apparatus in combination with the mechanical enclosure and radio frequency connector. This insertion and rotation is also illustrated in FIGS. 2 and 3.

The steps of the method do not have to be practiced in the listed order. For example, the inserting and rotating may be performed at the same time in certain embodiments.

Figure 7A:
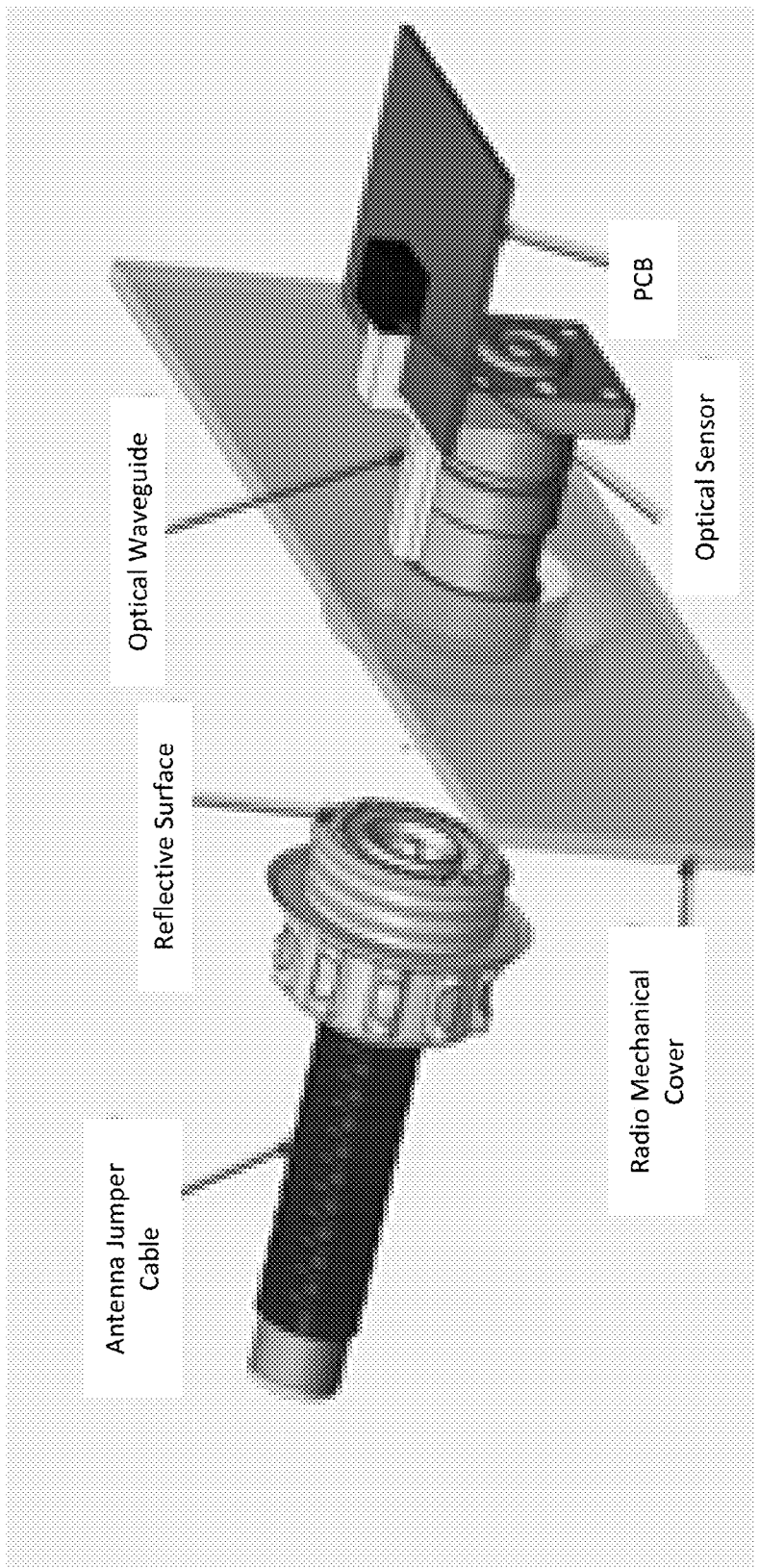
FIG. 7A illustrates an apparatus include an optical sensor, according to certain embodiments.

FIG. 7A illustrates an apparatus include an optical sensor, according to certain embodiments. As shown, the apparatus can include a similar base structure to that shown in FIGS. 1-4. For example, the apparatus can include an antenna jumper and radio mechanical cover. Additionally, the apparatus can include a reflective surface on a connector main body. The apparatus can also include a printed circuit board (PCB). An optical sensor can be mounted on the PCB. The apparatus can further include an optical waveguide directed alongside an RF connector and pointed at the reflective surface. The optical sensor and reflective surface can be configured to allow detection of whether the connector is connected.

Figure 7B:
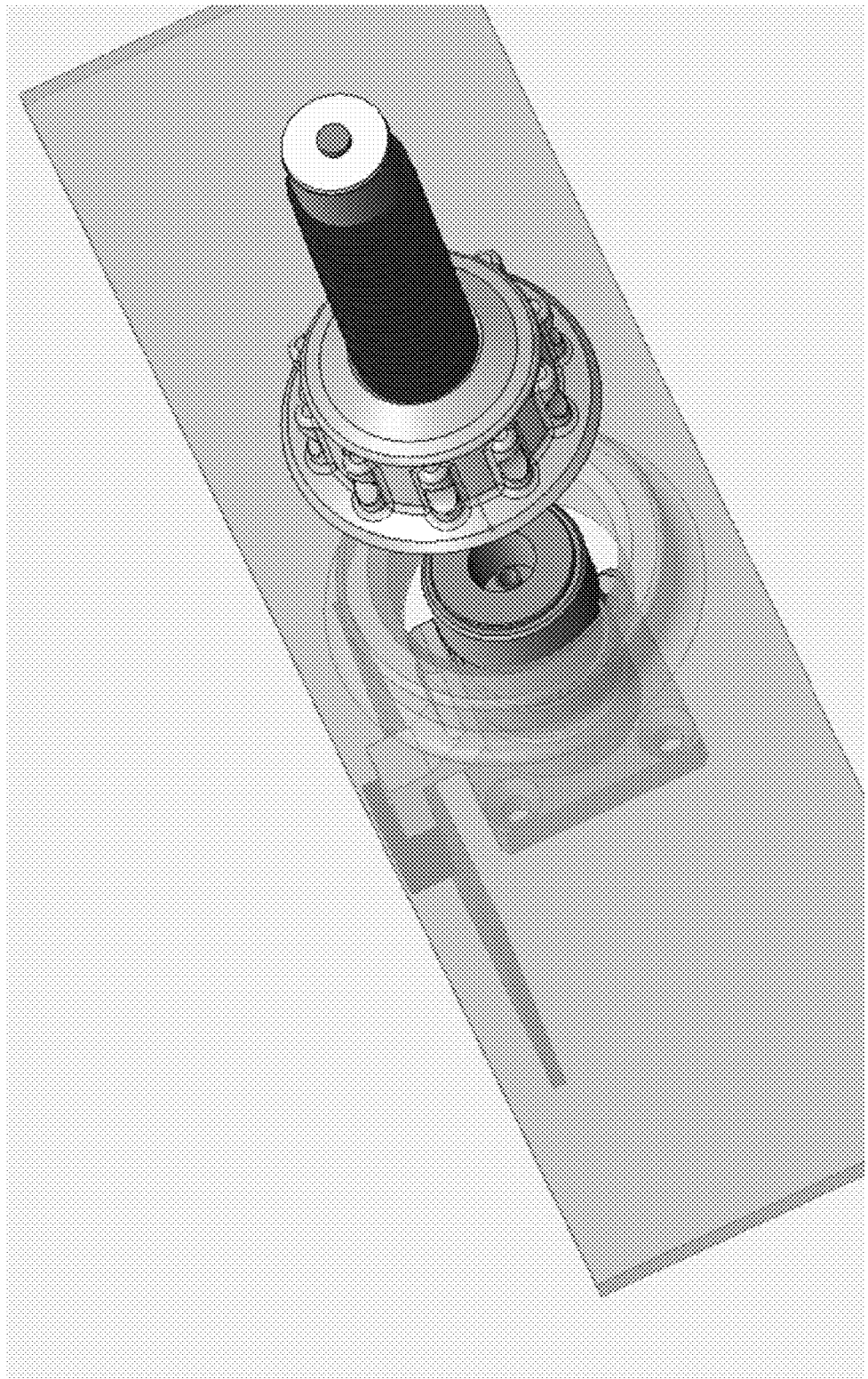
FIG. 7B illustrates the apparatus of FIG. 7A from a reverse angle.

FIG. 7B illustrates the apparatus of FIG. 7A from a reverse angle. As can be seen from FIG. 7B, the optical waveguide may be provided between the RF connector and the mechanical enclosure. Other waveguide arrangements may be provided. For example, the waveguide can be arranged such that the optical path is broken when the connector main body or an ingress protection cap is inserted.

FIG. 8A illustrates an apparatus include an ingress protection cap, according to certain embodiments. In FIG. 8A, the ingress protection (IP) cap is shown installed. This IP cap can similarly include a reflective surface provided to cover the end of the optical waveguide. This could be used to detect if there is connector or cap connected to device, based on the reflected material. Instead of an optical sensor, there could be another type of sensor, such as a magnetic detector.

FIG. 8B illustrates the apparatus of FIG. 8A in a reverse angle. As shown in the reverse angle, the IP cap may have a similar structure to that shown in FIG. 4.

FIGS. 7A, 7B, 8A, and 8B illustrate an optical presence sensor arrangement that can help avoid, or at least detect, problems of rubber plug misalignment or non-installation of a sealing plug. Detection of such problems can also be used for detection of similar problems for a sealing connector or cap. An optical sensor can provide notice when a cable or plug is installed in a correct place. Alternatively, or in addition, the optical sensor can provide an alarm when a plug is not in place. Alternatively, a system connected to the optical sensor can provide the notice or alarm. Additionally, a system or the optical sensor itself, can write detection or non-detection events to a log file.

Thus, certain embodiments can provide an IP protected connector. The IP cover can be used to rotate an antenna connector in cable, to antenna connector in filter. This can create IP protection between cable and connector, but also between radio frame and connector as well.

In certain embodiments, no external nut/screw or tape may be needed to create IP protection between cover and cable. Thus, there may be a shorter connector. The connector outer conductor diameter may range from about 4 mm to about 18 mm.

When certain embodiments are used, it is possible to have a presence sensor arrangement to determine whether there is a cable or cap attached. This approach may be possible, because IP protection can be provided with one part so it is possible to detect is the hole open or covered with antenna or IP cap.

In case cap/cable not in place there can be a log mark/signal. In certain embodiments, the system can be configured to prevent a base station from operating before attaching IP protection.

Figure 9:
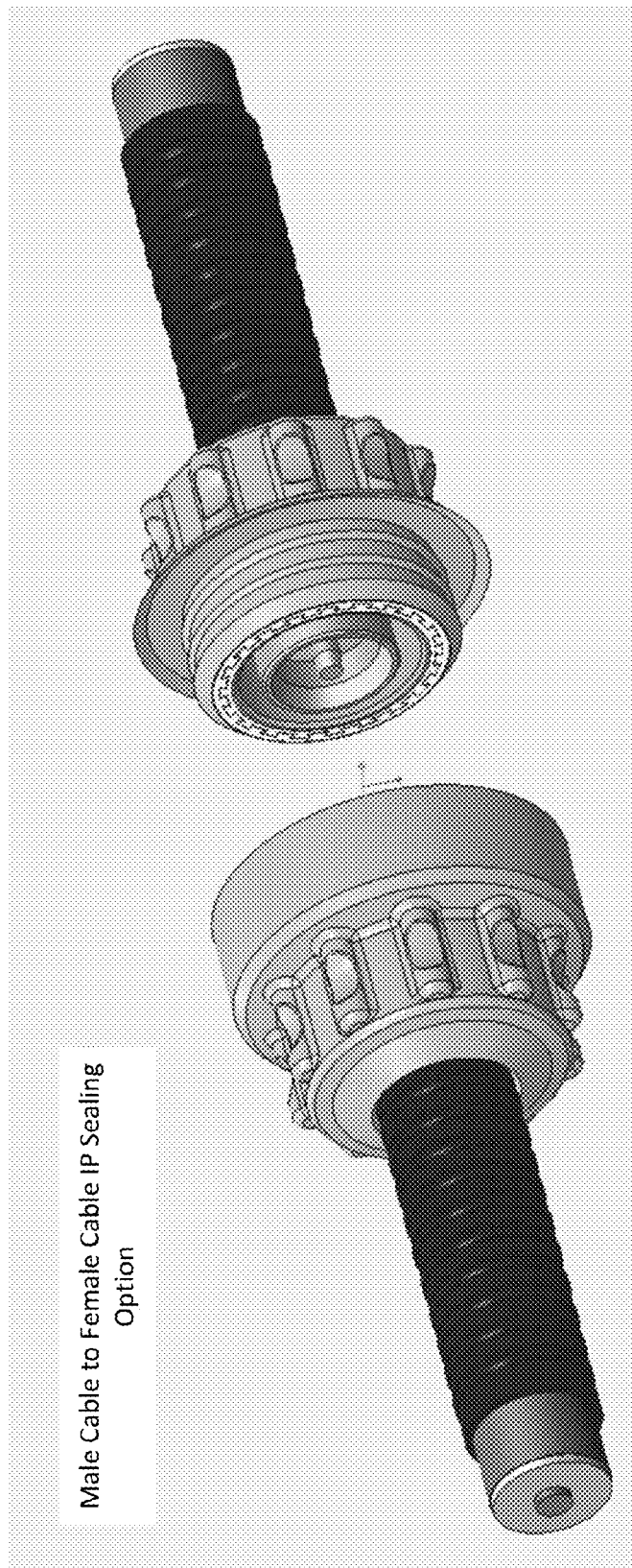
FIG. 9 illustrates a male to female connection, according to certain embodiments.

FIG. 9 illustrates a male to female connection, according to certain embodiments. As shown in FIG. 9, a female connector can be constructed with structures corresponding to the RF connector and mechanical enclosure in FIGS. 1-3. Thus, similar connectors can be used to connect one cable to another cable, without the need for butyl and/or vinyl tape or an external plastic cover.

Various embodiments may have benefits and/or advantages. For example, the structure of certain embodiments may allow for a short connector neck. The same idea can also be used for a water proof cap solution. The connection does not need extra tape assembly in site. Thus, the connector may be ready to use once the connector is fastened. Furthermore, the same principle can be applied also to connector to connector type assembly.

Furthermore, from a corrosion point of view, this connector may be very effective at prevent corrosion. Moreover, the installation time may be very short. Additionally, the space for the connector may smaller in the radio unit front panel.

Certain embodiments can be used in various systems. For example, certain embodiments can be used in a radio access system (RAS), active antenna system (AAS), remote radio head (RRH), or any antenna product.

Certain embodiments may be cost effective from several points of view. For example, the connector can be shorter, using less material. Additionally, in front panel usage there may be no need for other sealing nuts/gaskets. Furthermore, there may be less installation work in site, thereby reducing installation costs. The ingress protection may help to handle the field hard environment load in places like industrial cities and ocean climate.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. An apparatus, comprising:
   a connector main body comprising a ring-shaped member having an inner circumference defining a passage and an outer circumference;
   a connector axial body comprising a cylindrical member arranged partially within the passage,
   wherein the connector main body is configured to interface with a radio frequency connector at the inner circumference,
   wherein the connector main body is configured to interface, at the outer circumference, with a mechanical enclosure housing the radio frequency connector,
   wherein the connector axial body is configured to interface with an inner portion of the radio frequency connector, and
   wherein the connector axial body is configured to provide a radio frequency path through the connector axial body.

2. The apparatus of claim 1, wherein the connector main body comprises a first shoulder extending radially outward from the outer circumference, wherein the first shoulder is configured to seat the apparatus on the mechanical enclosure.

3. The apparatus of claim 2, wherein the first shoulder is configured to seal the interface between the outer circumference and the mechanical enclosure.

4. The apparatus of claim 1, wherein the connector main body further comprises a first plurality of protrusions extending from the outer circumference of the connector main body, wherein the first plurality of protrusions are configured to provide an interference fit with an inner circumference of the mechanical enclosure.

5. The apparatus of claim 4, wherein the first plurality of protrusions are configured to permit movement of the apparatus in an insertion direction into the mechanical enclosure and to resist movement of the apparatus in an opposite direction to the insertion direction.

6. The apparatus of claim 1, wherein the connector main body comprises a second shoulder, wherein the second shoulder is configured to seal an interface between the connector main body and the connector axial body.

7. The apparatus of claim 1, wherein the connector main body comprises a second plurality of protrusions extending from the inner circumference of the connector main body, wherein the second plurality of protrusions are configured to provide an interference fit with the connector axial body.

8. The apparatus of claim 7, wherein the second plurality of protrusions are configured to permit movement of the connector axial body in a direction of opposite an insertion direction into the mechanical enclosure and to resist movement of the connector axial body in the insertion direction.

9. The apparatus of claim 1, wherein the connector main body comprises a third shoulder, wherein the third shoulder is configured to permit movement of the connector axial body in an insertion direction into the mechanical enclosure and to resist movement of the connector axial body in a direction opposite the insertion direction.

10. The apparatus of claim 1, wherein the connector axial body comprises a termination portion at one end thereof, wherein the termination portion comprises a fourth shoulder, configured to seat the connector axial body on the radio frequency connector.

11. The apparatus of claim 1, wherein the connector axial body comprises a plurality of ridges, wherein the plurality of ridges are configured to limit sliding of the connector axial body with respect to connector main body.

12. The apparatus of claim 1, further comprising:
    a grip disposed on an outer surface of the connector main body.

13. The apparatus of claim 1, wherein the mechanical enclosure comprises a radio front panel.

14. The apparatus of claim 1, wherein the connector axial body comprises a male connector configured to be inserted into a corresponding female connector in the radio frequency connector.

15. The apparatus of claim 1, further comprising:
    an optical sensor configured to detect whether the apparatus is ingress protected.

16. The apparatus of claim 15, further comprising:
    an optical waveguide connected to the optical sensor and directed toward the connector main body.

17. The apparatus of claim 1, further comprising:
    an ingress protection cap configured to be removably connected to the mechanical enclosure housing the radio frequency connector in place of the connector main body and connector axial body.

18. A method of manufacturing an apparatus, comprising:
    providing a connector main body comprising a ring-shaped member having an inner circumference defining a passage and an outer circumference;
    arranging, partially within the passage, a connector axial body comprising a cylindrical member;
    configuring the connector main body to interface with a radio frequency connector at the inner circumference;
    configuring the connector main body to interface, at the outer circumference, with a mechanical enclosure housing the radio frequency connector;
    configuring the connector axial body to interface with an inner portion of the radio frequency connector; and
    configuring the connector axial body to provide a radio frequency path through the connector axial body.

19. A method of installing an apparatus, comprising:
    providing an apparatus comprising a connector main body comprising a ring-shaped member having an inner circumference defining a passage and an outer circumference and comprising a connector axial body comprising a cylindrical member arranged partially within the passage, wherein the connector main body is configured to interface with a radio frequency connector at the inner circumference, wherein the connector main body is configured to interface, at the outer circumference, with a mechanical enclosure housing the radio frequency connector, wherein the connector axial body is configured to interface with an inner portion of the radio frequency connector, and wherein the connector axial body is configured to provide a radio frequency path through the connector axial body; and inserting the apparatus into the mechanical enclosure and radio frequency connector; and rotating the apparatus to secure the apparatus in combination with the mechanical enclosure and radio frequency connector.

20. The method of claim 19, wherein the rotating is performed using low torque.

* * * * *